United States Patent
Okajima

(10) Patent No.: US 7,187,458 B2
(45) Date of Patent: Mar. 6, 2007

(54) PRINTER

(75) Inventor: Aiko Okajima, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 965 days.

(21) Appl. No.: 10/026,429

(22) Filed: Dec. 27, 2001

(65) Prior Publication Data

US 2003/0123088 A1    Jul. 3, 2003

(51) Int. Cl.
*G06F 15/00* (2006.01)
*G03G 15/00* (2006.01)

(52) U.S. Cl. .................. 358/1.13; 358/1.15; 358/1.12; 399/81; 399/82; 399/83

(58) Field of Classification Search ............ 399/81–83; 358/1.15, 1.12, 498, 1.13
See application file for complete search history.

(56) References Cited

U.S. PATENT DOCUMENTS 6,071,030 A * 6/2000 Hunter et al. ................. 402/79
6,169,863 B1 * 1/2001 Osari et al. .................... 399/82
6,332,170 B1 * 12/2001 Ban .............................. 710/6
6,421,509 B1 * 7/2002 Nomura et al. ............... 399/81
6,452,694 B1 * 9/2002 Eisenberg et al. .......... 358/1.18
6,762,853 B1 * 7/2004 Takagi et al. .............. 358/1.15
6,894,792 B1 * 5/2005 Abe .......................... 358/1.15
6,930,796 B1 * 8/2005 Matsuura et al. ............ 358/1.2
7,019,851 B2 * 3/2006 Kanazawa et al. ......... 358/1.12

FOREIGN PATENT DOCUMENTS

JP    2000-159391         6/2000
JP    2000159391 A    *   6/2000

* cited by examiner

*Primary Examiner*—Douglas Q. Tran
*Assistant Examiner*—Chan S. Park
(74) *Attorney, Agent, or Firm*—Foley & Lardner LLP

(57) ABSTRACT

A printer comprises a receiving section which receives printing jobs from a networked personal computers, a storage section which stores the received printing jobs, and a printing section which executes a printing job extracted from the storage section. A control section of the printer determines whether the printing jobs received by the receiving section include special printing, and causes a display section to display a list of the printing jobs including the special printing. The printing section executes the printing job selected from the displayed list by the user through an input section.

14 Claims, 4 Drawing Sheets

PRINTER

BACKGROUND OF THE INVENTION

The present invention relates to a printer which prints an image and/or character on a paper sheet based n printing jobs sent from networked personal computers.

In general, a printer used in an office or the like is networked to a plurality of personal computers via a printer server. The printer server receives and stores printing jobs sent from the respective personal computers. At the same time, the printer executes the printing jobs in the order in which the printer server receives them, and prints an image and/or characters on a paper sheet.

However, it is known that, in the case where the printing jobs include printing on a special paper sheet other than a normal paper sheet, such as a thick paper sheet or a tab paper sheet, jamming is liable to occur during the printing on the special paper sheet. When jamming occurs, the printing job is interrupted, while the user is unaware of it. Further, when the printing jobs including special paper printing are processed, if a special paper sheet is not set in a paper feed cassette or a manual feed tray, the printing job may be interrupted, while the user is unaware of it.

If the printing jobs are interrupted as mentioned above, successive printing jobs continuously stored in the printer server cannot be executed until someone recognizes and copes with the jamming or sets a special paper sheet.

BRIEF SUMMARY OF THE INVENTION

The present invention was made in consideration of the above matters and its object is to provide a printer, which has an increased availability factor.

To achieve the above object, a printer according to an embodiment of the present invention comprises a receiving section which receives printing jobs from networked personal computers, a storage section which stores the received printing jobs, and a printing section which executes a printing job extracted from the storage section. A control section of the printer determines whether the printing jobs received by the receiving section include special printing, and causes a display section to display a list of the printing jobs including the special printing. The printing section executes the printing job selected from the displayed list by the user through an input section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described in detail with reference to the drawings.

Figure 1:
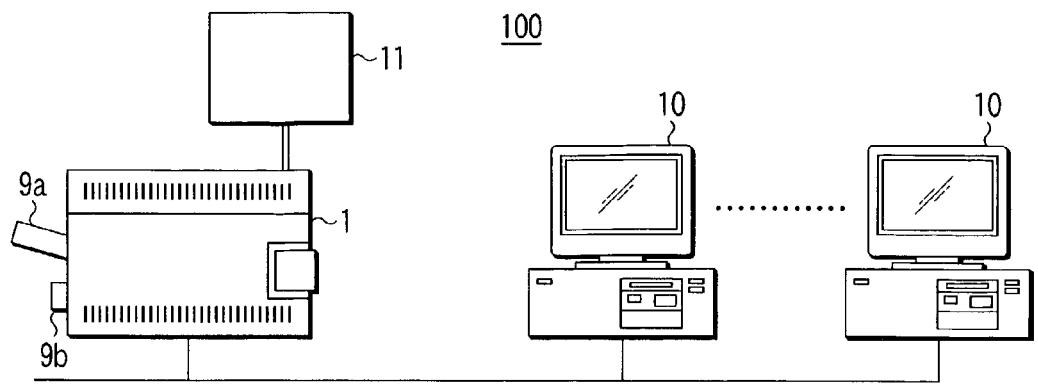
FIG. 1 is a schematic diagram showing a print system, in which a printer according to an embodiment of the present invention is networked to a plurality of personal computers.

FIG. 1 shows a print system 100 in which a printer 1 according to an embodiment of the present invention is networked to a plurality of personal computers (terminals) 10.

The user operates the personal computer 10 to input data necessary for printing, such as an image or character. The personal computer 10 send a command to execute the printing based on the input data to the printer 1 as a printing job. The printer 1 receives and stores printing jobs sent from the respective personal computers, and executes the printing jobs basically in the order in which it receives them.

Figure 2:
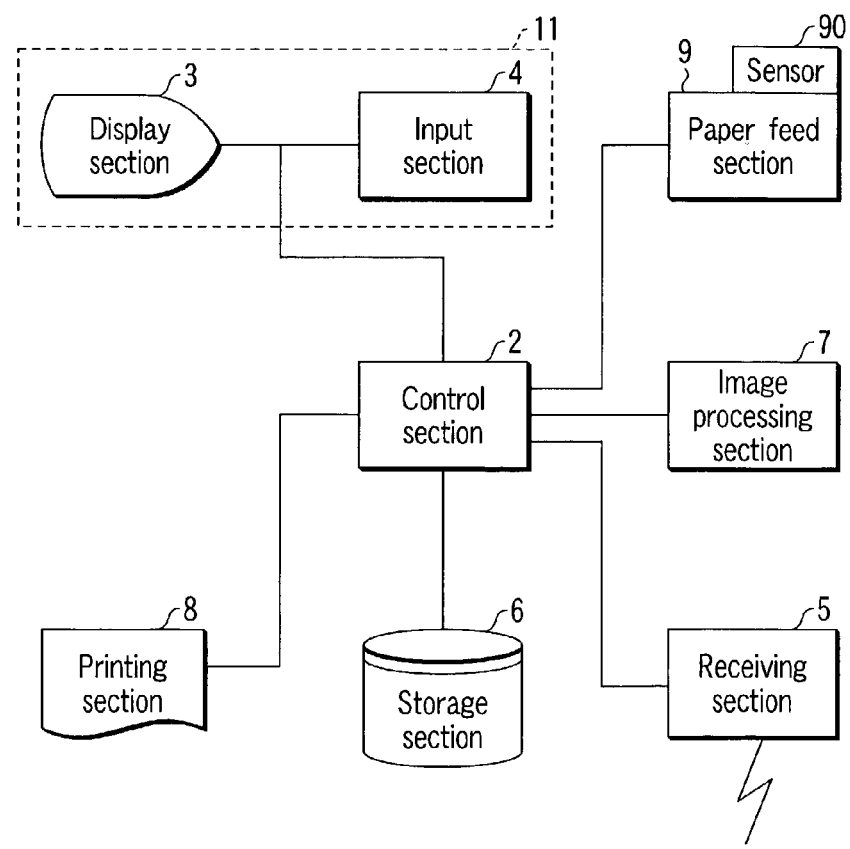
FIG. 2 is a block diagram showing a structure of the printer incorporated in the print system shown in FIG. 1.

FIG. 2 shows structural elements of the printer 1 in a block diagram.

The printer 1 has a control section 2, which controls operations of the printer 1. The control section 2 is connected with an operation panel 11 of a touch panel system having a function as a display section 3 and a function as an input section 4, a receiving section 5 which receives printing jobs sent from the personal computers 10, a storage section 6 which stores the received printing jobs, an image processing section 7 which processes page data contained in the printing jobs as necessary, a printing section 8 which executes the printing jobs, and a paper feed section 9 which feeds paper sheets to the printing section 8.

The paper feed section 9 comprises two paper feed cassettes 9a and 9b (see FIG. 1) and a manual feed tray, which is not shown. It also comprises a sensor 90 for sensing the presence or absence of the paper feed cassettes and the manual feed tray. Not only normal paper sheets but also special paper sheets, such as tab paper sheets, can be set in the paper feed cassettes 9a and 9b and the manual feed tray. The tab paper sheet refers to a rectangular paper sheet having a tab integrally protruded from one side of the sheet. Besides the tab paper sheets, the special paper sheets include thick paper sheets or foreign paper sheets (made in the United States, China, etc.).

The control section 2 also serves as a determining section of the present invention, which determines whether the printing jobs received through the receiving section 5 include printing on a special paper sheet, such as a tab paper sheet (hereinafter referred to as special printing). In this description, printing, which causes jamming more easily as compared to the printing on normal paper sheets, is referred to as special printing.

The storage section 6 stores all printing jobs received from the personal computers via the receiving section 5. In particular, it stores a specific printing job, which is determined by the control section 2 as including special printing, separately from the printing jobs that do not include special printing.

The display section 3 displays a list of specific printing jobs, which are determined by the control section 2 as including special printing, of the printing jobs stored in the storage section 6. The list may be displayed as the names of the users of the personal computers 10 as well as the printing job names, and so forth.

The input section 4 accepts various operation inputs by the user. The user selects a printing job to be executed from the list displayed through the display section 3, and inputs it through the input section 4. In this embodiment, the display section 3 and the input section 4 compose the operation panel 11 of the touch panel system. Therefore, when the user touches an item displayed through the display section 3, the corresponding printing job is selected.

In printing on, for example, a tab paper sheet, the image processing section 7 shifts page data to be printed by the amount corresponding to the tab. Alternatively, the paper feed section 9 may shift the timing of feeding a tab paper sheet by the amount corresponding to the tab.

The printing section 8 prints, on a paper sheet (including a tab paper sheet) fed from the paper feed section 9, an image and/or characters in page data contained in the printing job read from the storage section 6.

An operation of the above-mentioned printer 1 will now be described with reference to the flowcharts shown in FIGS. 3 to 5.

Figure 3:
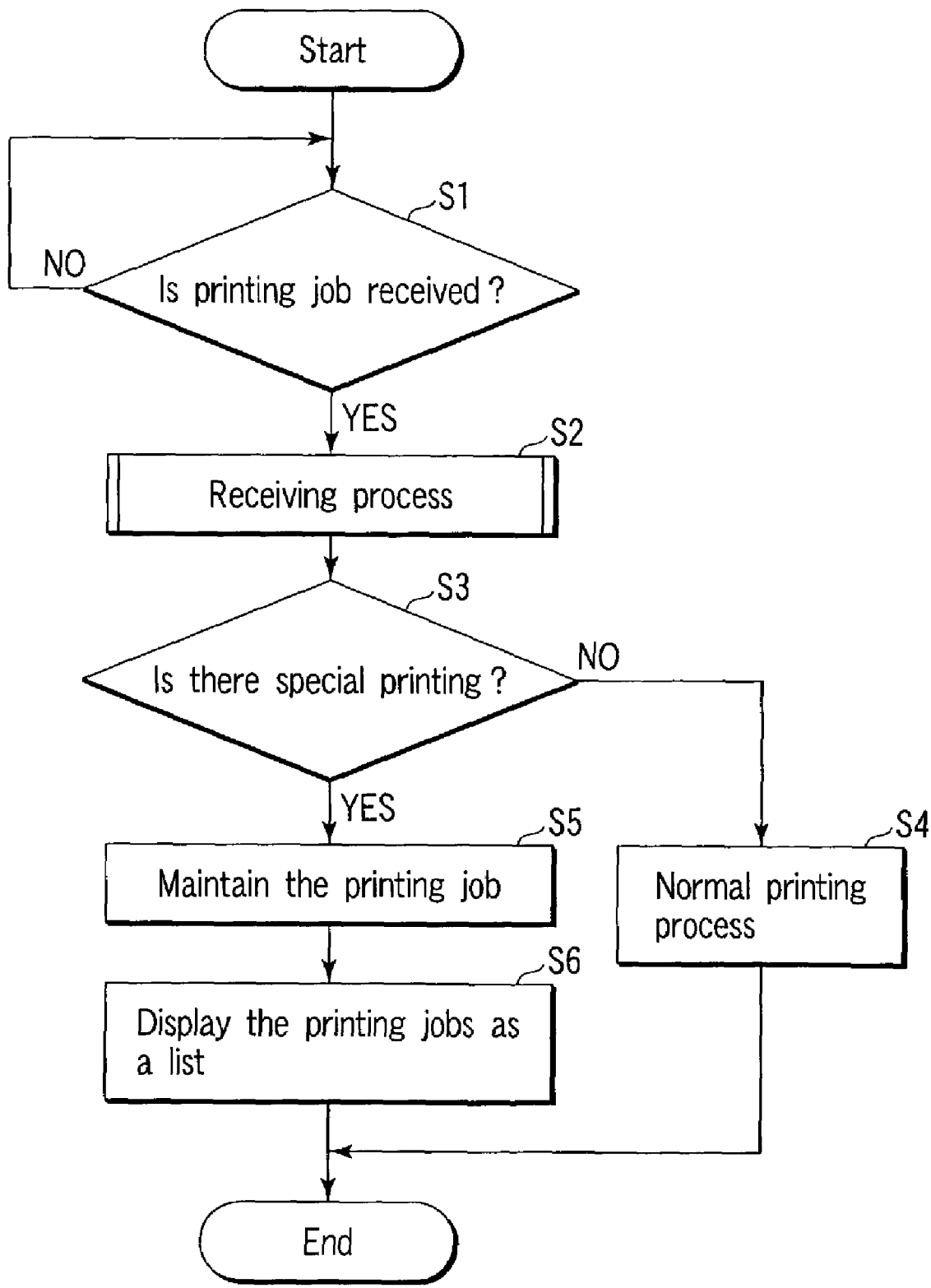
FIG. 3 is a flowchart for explaining operations of the printer shown in FIG. 2.
Figure 4:
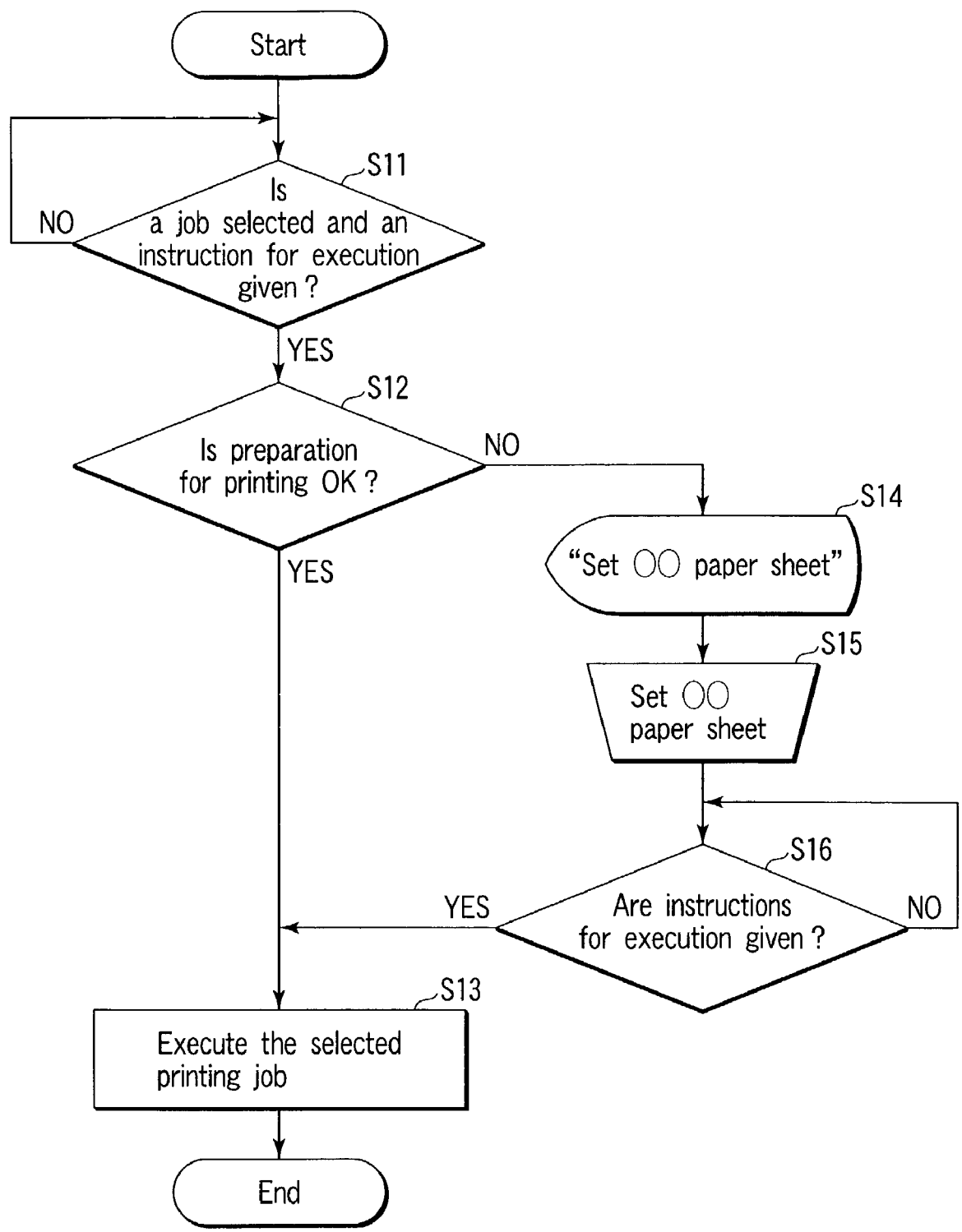
FIG. 4 is a flowchart for explaining operations of the printer shown in FIG. 2.

First, as shown in FIG. 3, when a printing job is sent from a personal computer 10 through the network (a step 1; YES), the printing job is received through the receiving section 5 of the printer 1 (a step 2). The received printing job is stored in the storage section 6.

Figure 5:
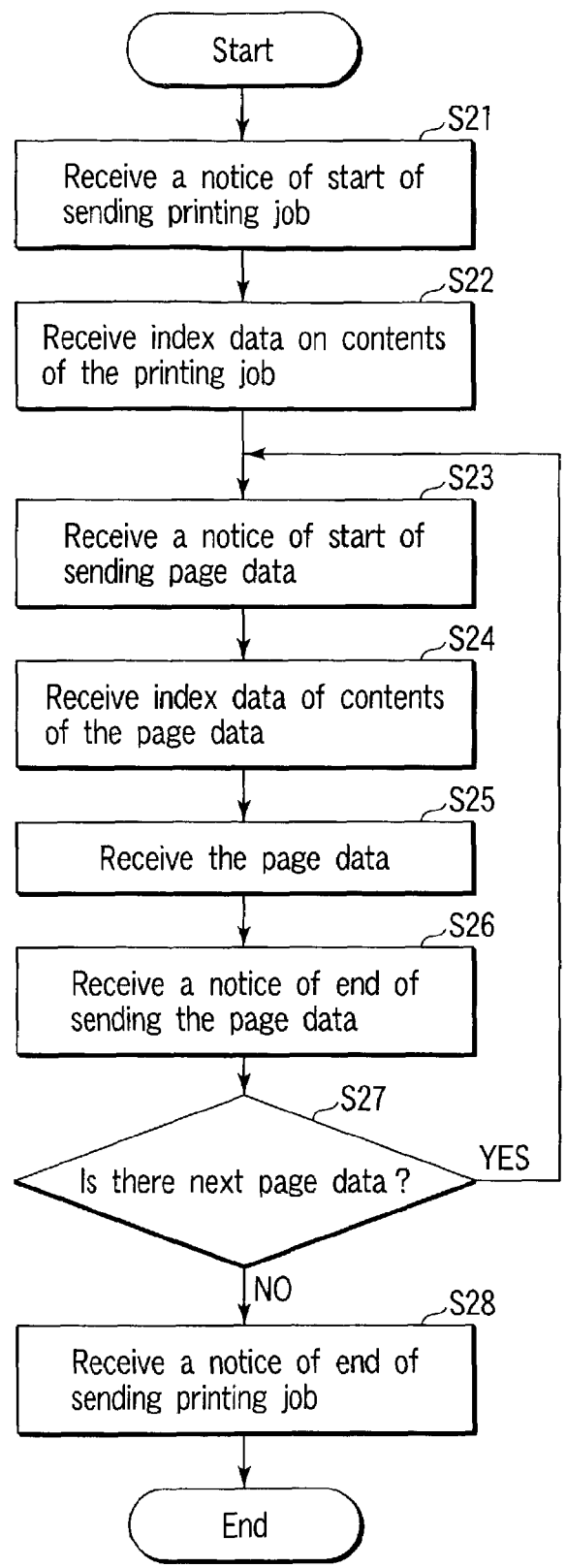
FIG. 5 is a flowchart for explaining steps of the receiving process shown in FIG. 3.

In a receiving process of the step 2, as shown in FIG. 5, the printer 1 first receives a notice of start of sending printing job sent from the sender personal computer 10 (a step 21). Then, it receives index data (hereinafter referred to as the job index) representing the contents of the printing job (a step 22). Thereafter, it receives a notice of start of sending page data of the first page contained in the printing job (a step 23). Then, it receives index data (hereinafter referred to as the page index) representing the contents of the page data (a step 24). Thereafter, it receives the page data (a step 25). Then, it receives a notice of end of sending the page data (a step 26). If there is page data on the second and subsequent pages (a step 27; YES), the process of the steps 23 to 26 is repeated a number of times corresponding to the pages, so that the page data on the second and subsequent pages are received. If it is determined that there is no subsequent page data in the step 27 (the step 27; NO), a notice of end of sending the printing job is received and the operation is ended (a step 28).

In the receiving process of the step 2 (i.e., the steps 21 to 28), the control section 2 determines whether the received printing job includes special printing (a step 3). If it is determined in the step 3 that the printing job does not include special printing (the step 3; NO), the printing job is read from the storage section 6 and immediately executed by the printing section 8, and a normal printing process is performed (a step 4).

To the contrary, if it is determined in the step 3 that the printing job includes special printing (the step 3; YES), the printing job is not executed but held in the storage section 6 (a step 5). In other words, printing jobs including special printing are accumulated in the storage section 6 without being executed.

Then, a list of the printing jobs including the special printing stored in the storage section 6 is displayed through the display section 3 (a step 6). In the state where the printing jobs including the special printing are thus displayed as a list through the display section 3, the user's instruction for execution of a printing job is waited for.

In this state, when an instruction for execution of a printing job (i.e., an action of touching a selected printing job) is given by the user through the input section 4 of the printer 1 (a step 11; YES), the printing job is executed by the printing section 8 (a step 13) on the condition that preparation for the printing job on the printer side has been made (a step 12; YES). The wording "preparation for the printing job" used here refers to, for example, setting of a tab paper sheet for use in special printing in the predetermined paper feed cassette (or the manual feed tray).

On the contrary, if it is determined in the step 12, for example, that no tab paper sheet is set through the sensor 90, therefore, preparation for printing has not been made, the operation guide "Set tab paper" is displayed through the display section 3 (a step 14). The user observes the guide and sets a tab paper sheet in the predetermined paper feed cassette or the manual feed tray (a step 15). Then, the process of the step 13 is executed on the condition that instructions for execution of the printing job are given by the user again (a step 16; YES).

The determination process of the step 3 will be described with reference to some examples.

According to a first embodiment, it is determined, in the process of receiving the printing job in the step 2, whether the page index of each page received in the step 24 includes information on special printing. The information on special printing includes a tab paper flag representing that printing on a tab paper sheet should be performed, information on a paper feeder, size information, etc.

The printers are divided broadly into two types.

In a first type, the printer executes a printing job after completion of the process of receiving the printing job. In this type, it is determined whether a page index including special printing is received, when the printing job reception is completed. If there is no page index including special printing in the received printing job, the printing job is stored in the storage section 6 and immediately executed by the printing section 8. If there is a page index including special printing, the printing job is stored in the storage section 6 and displayed through the display section 3.

In a second type, each time the printer receives page data in the step 25 during the process of receiving the printing job, it sends the page data to the printing section 8 to print the page. In this type, if the printing job is already being executed when it is determined that the page index includes information on special printing in the receiving process, the printing job is interrupted and the process is shifted to the step 5 shown in FIG. 3. Alternatively, if the printing job has not been executed when it is determined that the page index including special printing is received, the process is immediately shifted to the step 5.

In a second embodiment, it is determined during the printing job receiving process of the step 2 whether the job index of the printing job received in the step 22 includes information on special printing. In this case, when it is determined that the job index including special printing is received, the process is shifted to the step 5.

Thus, according to the embodiments described above, when the printer 1 receives a printing job including printing on a special paper sheet such as a tab paper sheet, the printer does not immediately execute the printing job but stores it in the storage section 6 and displays it through the display section 3. Then, the printing job is read from the storage section 6 and executed by the printing section 8 on condition that the instructions for execution of the printing job is made through the input section 4 by the user.

Therefore, if a special paper sheet for use in the printing job, for example, a tab paper sheet is not prepared or jamming occurs during the printing on a special paper sheet, the user can immediately deal with the problem, since he/she is present close to the printer 1. Accordingly, it is possible to significantly reduce the time in which the subsequent printing job is withheld because of an unnoticed paper-out condition or jamming. As a result, the availability factor of the printer can be increased.

In addition, since the storage section 6 of the printer 1 holds the printing jobs including special printing and the list thereof is displayed, the user can come to the printer 1 at suitable timing and make it execute the printing job. Thus, the convenience is increased. Further, when the printing job is executed, special printing can be performed on trial, or the printing position relative to the tab can be adjusted in view of the tab paper sheet actually output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the printer 1 may notify the user's personal computer of the timing when the user should make the printer 1 execute the printing job including special printing. In other words, the personal computer of the user may be notified that special printing is included in the printing job sent to the printer 1 by the user, and also notified of the number or order of printing jobs including special printing sent by another user.

What is claimed is:

1. A printer comprising:
   a receiving section which receives printing jobs;
   a storage section which stores the received printing jobs;
   a printing section which executes the printing jobs extracted from the storage section;
   a determining section which determines whether a page index of each page or a job index of a printing job which has been received by the receiving section includes information on special printing;
   a display section which displays a list of the printing jobs that are determined as including information on the special printing in the page index or the job index by the determining section;
   an input section which accepts a printing job selected by a user from the displayed list; and
   a control section which extracts from the storage section the printing job selected by the user, and causes the printing section to execute the selected printing job,
   wherein the control section prevents the printing section from printing any of the received printing jobs that include information on the special printing that are stored in the storage section, until the input section receives a selection made by the user for printing one or more of the received printing jobs that include information on the special printing, and
   wherein the one or more of the received printing jobs that include information on the special printing also include information on normal printing of at least one or more pages of the printing jobs.

2. A printer according to claim 1, wherein the special printing is printing on a special paper sheet other than a normal paper sheet.

3. A printer according to claim 2, wherein the special paper sheet is a tab paper sheet.

4. A printer according to claim 2, further comprising:
   a paper feed section which feeds the special paper sheet to the printing section; and
   a sensor which senses absence of the special paper sheet in the paper feed section,
   wherein when the printing job including the special printing is selected by the user through the input section, the control section causes the display section to display absence of the special paper sheet, on condition that the sensor senses absence of the special paper sheet in the paper feed section.

5. A printer according to claim 1, wherein execution of a printing job including the special printing is prevented unless the input section receives a selection made by the user for printing the printing job.

6. A print system comprising:
   at least one terminal which receives input data for printing and sends printing jobs for executing the printing based on the input data; and
   a printer which is networked to the terminal and executes the printing jobs sent from the terminal to the printer, said printer comprising:
   a receiving section which receives the printing jobs sent from the terminal;
   a storage section which stores the received printing jobs;
   a printing section which executes the printing jobs extracted from the storage section;
   a determining section which determines whether a page index of each page or a job index of a printing job which has been received by the receiving section includes information on special printing;
   a display section which displays a list of the printing jobs that are determined as including information on the special printing in the page index or the job index by the determining section;
   an input section which accepts a printing job selected by a user from the displayed list; and
   a control section which extracts from the storage section the printing job selected by the user, and causes the printing section to execute the selected printing job,
   wherein one or more of the received printing jobs include information on the special printing and also include information on normal printing of at least one or more pages of the printing jobs.

7. A print system according to claim 6, wherein the special printing is printing on a special paper sheet other than a normal paper sheet.

8. A print system according to claim 7, wherein the special paper sheet is a tab paper sheet.

9. A print system according to claim 7, wherein said printer further comprises:
   a paper feed section which feeds the special paper sheet to the printing section; and
   a sensor which senses absence of the special paper sheet in the paper feed section,
   wherein the printing job including the special printing is selected by the user through the input section, the control section causes the display section to display absence of the special paper sheet, on condition that the sensor senses absence of the special paper sheet in the paper feed section.

10. A print system according to claim 6, wherein execution of a printing job including the special printing is prevented unless the input section receives a selection made by the user for printing the printing job.

11. A printing method comprising:

receiving printing jobs;

determining whether a page index of each page or a job index of the received printing job includes information on special printing;

executing the printing jobs that are determined as not including information on special printing in the page index or the job index;

displaying a list of the printing jobs that are determined as including information on the special printing in the page index or the job index without executing the printing jobs;

accepting a printing job selected by a user from the displayed list; and executing the printing job selected by the user, wherein one or more of the received printing jobs include information on the special printing and also include information on normal printing of at least one or more pages of the printing jobs.

12. A printing method according to claim 11, wherein the special printing is printing on a special paper sheet other than a normal paper sheet.

13. A printing method according to claim 12, wherein the special paper sheet is a tab paper sheet.

14. A printing method according to claim 11, wherein execution of a printing job including the special printing is prevented unless the input section receives a selection made by the user for printing the printing job.

* * * * *